(12) United States Patent
Sasaki et al.

(10) Patent No.: US 12,500,397 B2
(45) Date of Patent: Dec. 16, 2025

(54) CONNECTION APPARATUS FOR ELECTRIC DEVICE, AND ELECTRIC APPARATUS

(71) Applicant: TOSHIBA MITSUBISHI-ELECTRIC INDUSTRIAL SYSTEMS CORPORATION, Tokyo (JP)

(72) Inventors: Tsubasa Sasaki, Chuo-ku (JP); Hidetaka Ishitobi, Chuo-ku (JP)

(73) Assignee: TMEIC CORPORATION, Tokyo (JP)

( * ) Notice: Subject to any disclaimer, the term of this patent is extended or adjusted under 35 U.S.C. 154(b) by 212 days.

(21) Appl. No.: 18/578,422

(22) PCT Filed: May 31, 2022

(86) PCT No.: PCT/JP2022/022194
§ 371 (c)(1),
(2) Date: Jan. 11, 2024

(87) PCT Pub. No.: WO2023/233542
PCT Pub. Date: Dec. 7, 2023

(65) Prior Publication Data
US 2024/0297483 A1    Sep. 5, 2024

(51) Int. Cl.
*H02B 1/20* (2006.01)
(52) U.S. Cl.
CPC ..................... *H02B 1/20* (2013.01)
(58) Field of Classification Search
CPC ........................................ H01B 1/20
See application file for complete search history.

(56) References Cited

U.S. PATENT DOCUMENTS

| 5,949,641 A | * | 9/1999 | Walker | H02B 1/308 |
| | | | | 200/50.01 |
| 2008/0055822 A1 | * | 3/2008 | Rearick | H05K 7/186 |
| | | | | 361/641 |

(Continued)

FOREIGN PATENT DOCUMENTS

| JP | 2016-208601 A | 12/2016 |
| KR | 10-2005-0080447 A | 8/2005 |

OTHER PUBLICATIONS

Korean Office Action issued May 27, 2025 in Korean Patent Application No. 10-2024-7001148 with English Machine translation, 8 pgs.

(Continued)

*Primary Examiner* — Timothy J Thompson
*Assistant Examiner* — Rhadames Alonzo Miller
(74) *Attorney, Agent, or Firm* — Oblon, McClelland, Maier & Neustadt, L.L.P.

(57) ABSTRACT

A plurality of connection members extend in a first direction perpendicular to a vertical direction. A plurality of terminal members are attached to the plurality of connection members, respectively. Each of the plurality of terminal members includes a fixed portion and a connected portion. The fixed portion is attached to a connection member and extends in the first direction. The connected portion is joined to one end portion of the fixed portion in a longitudinal direction, and an electric wire is connected to the connected portion. The connected portion extends in a direction orthogonal to the direction in which the fixed portion extends. Each of the plurality of terminal members is attached to the connection member in any of a first attitude in which the connected portion extends upward in the vertical direction and a second attitude in which the connected portion extends downward in the vertical direction.

12 Claims, 7 Drawing Sheets

(56) References Cited

U.S. PATENT DOCUMENTS

2018/0366790 A1* 12/2018 Saito ................. H01M 10/4257
2019/0157849 A1*  5/2019 Karle ........................ H02B 1/32
2021/0313779 A1* 10/2021 Zhao ...................... H05K 7/186
2024/0348019 A1* 10/2024 Dar ........................ H02J 7/0042

OTHER PUBLICATIONS

International Search Report issued Aug. 9, 2022 in PCT/JP2022/022194, filed on May 31, 2022, 2 pages.

* cited by examiner

CONNECTION APPARATUS FOR ELECTRIC DEVICE, AND ELECTRIC APPARATUS

TECHNICAL FIELD

The present disclosure relates to a connection apparatus for an electric device, and an electric apparatus.

BACKGROUND ART

Japanese Patent Laying-Open No. 2016-208601 (PTL 1) discloses a connection apparatus for connecting an electric device and electric wires. The connection apparatus has a first connection conductor connected to a U-phase terminal of the electric device, a second connection conductor connected to a V-phase terminal of the electric device, a third connection conductor connected to a W-phase terminal of the electric device, a first terminal conductor which is attached to the first connection conductor and to which a U-phase electric wire is connected, a second terminal conductor which is attached to the second connection conductor and to which a V-phase electric wire is connected, and a third terminal conductor which is attached to the third connection conductor and to which a W-phase electric wire is connected.

CITATION LIST

Patent Literature

PTL 1: Japanese Patent Laying-Open No. 2016-208601

SUMMARY OF INVENTION

Technical Problem

According to the connection apparatus described in PTL 1, whether the electric wires are drawn into a casing of the connection apparatus from above or from below, the electric wires can be connected to the terminal conductors without bending the electric wires.

On the other hand, in the connection apparatus described in PTL 1, the first to third connection conductors have shapes different from one another such that their lengths extending in a left-right direction of the casing are different from one another. The first to third terminal conductors attached to the first to third connection conductors, respectively, also have shapes different from one another such that connected portions to which the electric wires are connected are arranged at positions where they are displaced from one another in the left-right direction. Accordingly, there is a concern that the cost for processing the connection conductors and the terminal conductors may increase.

Further, in the connection apparatus described in PTL 1, since the connected portions of the first to third terminal conductors are arranged next to one another with a spacing therebetween in the left-right direction of the casing, there is a concern that the space for arranging the connection apparatus in the left-right direction may increase.

The present disclosure has been made to solve such a problem, and an object of the present disclosure is to provide a connection apparatus for an electric device, and an electric apparatus, capable of facilitating processing and achieving space-saving with a simple configuration.

Solution to Problem

A connection apparatus for an electric device in accordance with an aspect of the present disclosure is a connection apparatus for connecting an electric device and a plurality of electric wires, the connection apparatus including a plurality of connection members and a plurality of terminal members. The plurality of connection members are connected to the electric device and extend in a first direction perpendicular to a vertical direction. The plurality of terminal members are attached to the plurality of connection members, respectively, and the plurality of electric wires are connected to the plurality of terminal members, respectively. Each of the plurality of terminal members includes a fixed portion and a connected portion. The fixed portion is attached to a connection member and extends in the first direction. The connected portion is joined to one end portion of the fixed portion in a longitudinal direction, and an electric wire is connected to the connected portion. The connected portion extends in a direction orthogonal to the direction in which the fixed portion extends. Each of the plurality of terminal members is attached to the connection member in any of a first attitude in which the connected portion extends upward in the vertical direction and a second attitude in which the connected portion extends downward in the vertical direction.

Advantageous Effects of Invention

According to the present disclosure, it is possible to provide a connection apparatus for an electric device, and an electric apparatus, capable of facilitating processing and achieving space-saving with a simple configuration.

DESCRIPTION OF EMBODIMENTS

Hereinafter, an embodiment of the present disclosure will be described with reference to the drawings. It should be noted that identical or corresponding parts in the following drawings will be designated by the same reference numerals, and the description thereof will not be repeated.

<Configuration of Electric Apparatus>

Figure 1:
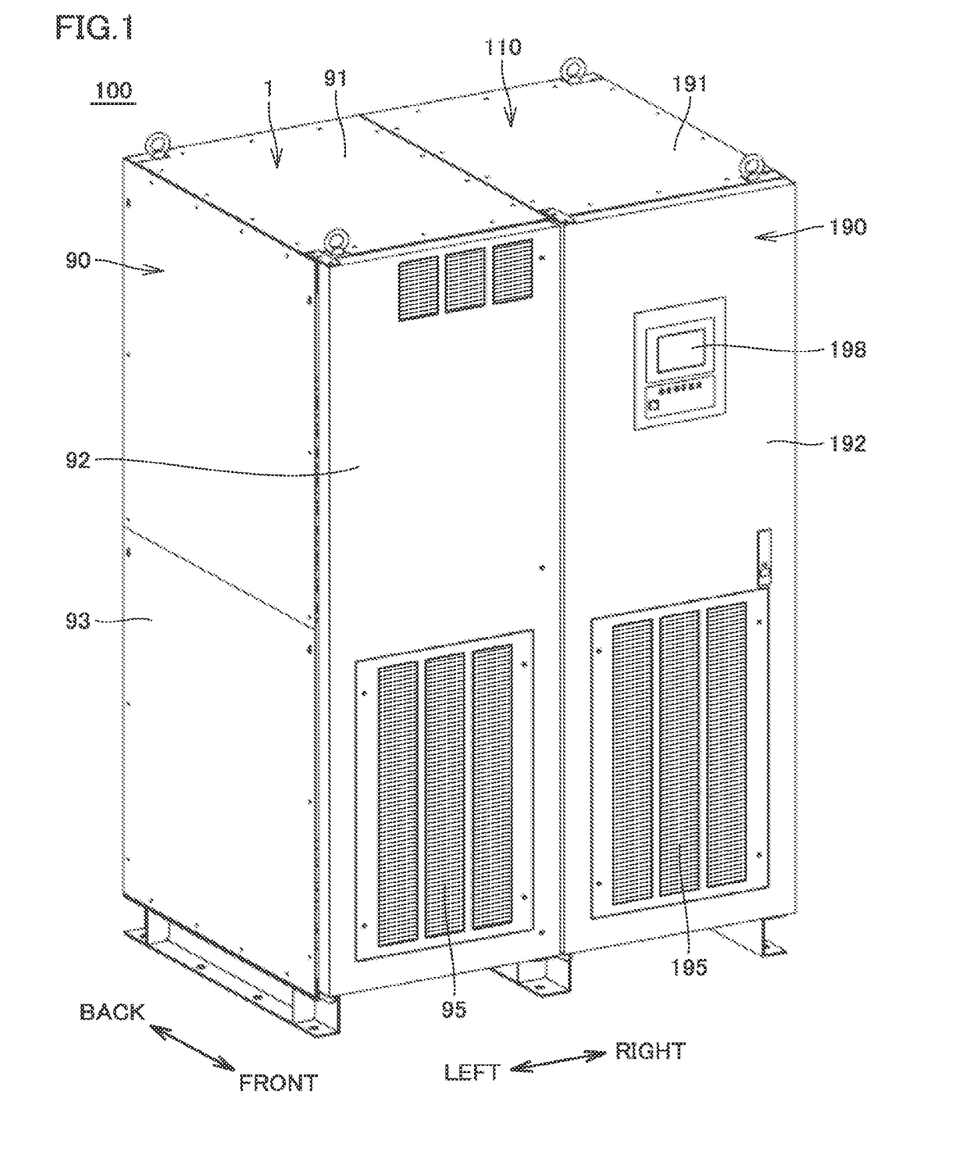
FIG. 1 is a perspective view showing an external appearance of an electric apparatus according to an embodiment.

FIG. 1 is a perspective view showing an external appearance of an electric apparatus according to an embodiment. An electric apparatus 100 according to the present embodiment includes a multiple power compensator 110 and a connection apparatus 1. Connection apparatus 1 is an apparatus for connecting multiple power compensator 110 and a plurality of electric wires (not shown). In the following, multiple power compensator 110 will be described as an example of an electric device to which connection apparatus 1 according to the present disclosure is applicable. However, connection apparatus 1 according to the present disclosure is applicable to any application for connecting an electric device such as a power conversion device or an uninterruptible power supply and a plurality of electric wires.

As shown in FIG. 1, multiple power compensator 110 includes a casing 190. Various devices constituting multiple power compensator 110 is housed in an inside of casing 190. Casing 190 has a substantially rectangular external shape. Casing 190 has a ceiling surface 191, a front surface 192, and side surfaces and a bottom surface that are not shown.

An opening 195 is formed in front surface 192 of casing 190. Opening 195 provides communication between an internal space of casing 190 and an outside. When a cooling fan not shown operates, air can flow from a front of casing 190 into the inside of casing 190 through opening 195. Front surface 192 of casing 190 is provided with an operation panel 198 through which a user operates multiple power compensator 110.

Connection apparatus 1 includes a casing 90. Casing 90 has a substantially rectangular external shape. Casing 90 has a ceiling surface 91, a front surface 92, a left side surface 93, and a bottom surface 94 not shown. An opening 95 is formed in front surface 92 of casing 90. Opening 95 provides communication between an internal space of casing 90 and the outside. Casing 90 and casing 190 are integrally formed, and the internal space of casing 90 and the internal space of casing 190 communicate with each other.

A front direction indicated by an arrow in FIG. 1 is defined as a front direction of multiple power compensator 110 and connection apparatus 1. A back direction indicated by an arrow in FIG. 1 is defined as a back direction of multiple power compensator 110 and connection apparatus 1. A right direction indicated by an arrow in FIG. 1 is defined as a right direction of multiple power compensator 110 and connection apparatus 1. A left direction indicated by an arrow in FIG. 1 is defined as a left direction of multiple power compensator 110 and connection apparatus 1.

An up-down direction of multiple power compensator 110 and connection apparatus 1 indicates a "vertical direction". A left-right direction of multiple power compensator 110 and connection apparatus 1 corresponds to one embodiment of a "first direction" perpendicular to the vertical direction, and a front-back direction of multiple power compensator 110 and connection apparatus 1 corresponds to one embodiment of a "second direction" perpendicular to the vertical direction and the first direction. The front-back direction of multiple power compensator 110 and connection apparatus 1 may be defined as a "first direction", and the left-right direction of multiple power compensator 110 and connection apparatus 1 may be defined as a "second direction".

<Configuration of Multiple Power Compensator>

Figure 2:
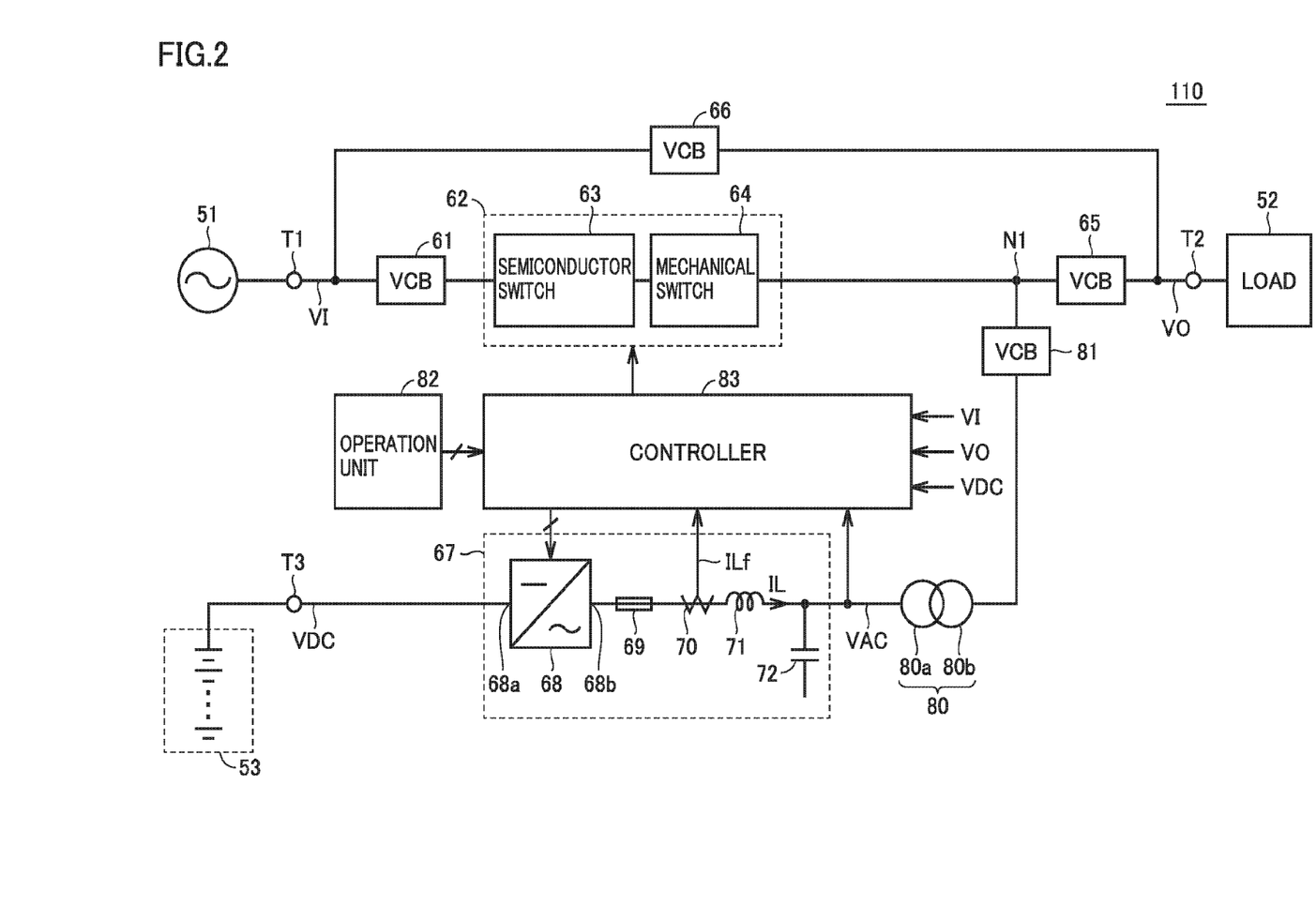
FIG. 2 is a circuit block diagram of a multiple power compensator.

FIG. 2 is a circuit block diagram of multiple power compensator 110. As shown in FIG. 2, multiple power compensator 110 includes an input terminal T1, an output terminal T2, a direct current (DC) terminal T3, vacuum circuit breakers (VCBs) 61, 65, 66, and 81, a high speed switch 62, a power converter 67, a transformer 80, an operation unit 82, and a controller 83.

Input terminal T1 receives an alternating current (AC) voltage VI having a commercial frequency supplied from a commercial AC power supply 51. An instantaneous value of AC voltage VI is detected by controller 83. When AC voltage VI falls below a lower limit value, controller 83 determines that a momentary voltage drop occurs.

Output terminal T2 is connected to a load 52. Load 52 is driven by an AC voltage VO supplied from output terminal T2. An instantaneous value of AC voltage VO is detected by controller 83. Although AC voltage VI and AC voltage VO are each a three-phase AC voltage (a U-phase voltage Vu, a V-phase voltage Vv, a W-phase voltage Vw), FIG. 2 shows only a part related to one phase for simplification of the drawing and the description.

DC terminal T3 is connected to a power storage apparatus 53. Power storage apparatus 53 may be a battery, or may be a capacitor. A DC voltage VDC of DC terminal T3 is detected by controller 83.

VCB 61, high speed switch 62, and VCB 65 are connected in series between input terminal T1 and output terminal T2. VCBs 61 and 65 are turned on during normal operation of multiple power compensator 110, and are turned off during maintenance of high speed switch 62 or during bypass power feeding, for example.

High speed switch 62 includes a semiconductor switch 63 and a mechanical switch 64 connected in series. Each of semiconductor switch 63 and mechanical switch 64 is controlled by controller 83, is turned on when AC voltage VI is normal, and is turned off when AC voltage VI is not normal (when a momentary voltage drop occurs).

VCB 66 is connected between input terminal T1 and output terminal T2. VCB 66 is turned off during normal operation of multiple power compensator 110, and is turned on during bypass power feeding, for example. When VCB 66 is turned on, AC voltage VI is supplied from commercial AC power supply 51 to load 52 via VCB 66, and load 52 is driven.

Power converter 67 includes a bidirectional converter 68, a fuse 69, a current detector 70, a reactor 71, and a capacitor 72. Bidirectional converter 68 has a DC terminal 68a connected to DC terminal T3, and an AC terminal 68b connected to a primary winding 80a of transformer 80 via fuse 69 and reactor 71. A secondary winding 80b of transformer 80 is connected via VCB 81 to a node N1 between high speed switch 62 and VCB 65.

Bidirectional converter 68 is a well-known bidirectional converter including a plurality of semiconductor switching elements and a plurality of diodes, and is pulse width modulation (PWM)-controlled by controller 83, for example. By turning on and off each semiconductor switching element included in bidirectional converter 68 at a predetermined switching frequency, AC power can be converted into DC power, and DC power can be converted into AC power.

Fuse 69 protects bidirectional converter 68 and the like from an overcurrent. Current detector 70 detects a current IL flowing into reactor 71, and provides controller 83 with a signal ILf indicating a detected value thereof.

Reactor 71 and capacitor 72 constitute an AC filter. The AC filter is a low pass filter, and converts an output voltage of bidirectional converter 68 into a sinusoidal AC voltage.

Transformer 80 transmits and receives AC power between node N1 and power converter 67. VCB 81 is turned on during normal operation of multiple power compensator 110, and is turned off during maintenance of high speed switch 62, power converter 67, and the like, for example.

Operation unit 82 receives the user's instruction based on the user's operation through the operation panel, and provides controller 83 with a signal indicating the user's instruction received. Controller 83 controls entire multiple power compensator 110 based on the signal from operation unit 82, AC voltages VI, VO, and VAC, DC voltage VDC, output signal ILf of current detector 70, and the like.

Specifically, when AC voltage VI supplied from commercial AC power supply 51 is normal, controller 83 controls bidirectional converter 68 such that DC voltage VDC of DC terminal T3 becomes equal to a predetermined reference DC voltage VDCr, based on AC voltage VAC, DC voltage VDC, and output signal ILf of current detector 70.

When AC voltage VI supplied from commercial AC power supply 51 is not normal, controller 83 controls bidirectional converter 68 such that AC voltage VO becomes equal to a predetermined reference AC voltage VOr, based on AC voltage VO of output terminal T2 and output signal ILf of current detector 70.

<Configuration of Connection Apparatus>

Next, a configuration of connection apparatus 1 will be described with reference to FIGS. 3 to 5.

Figure 3:
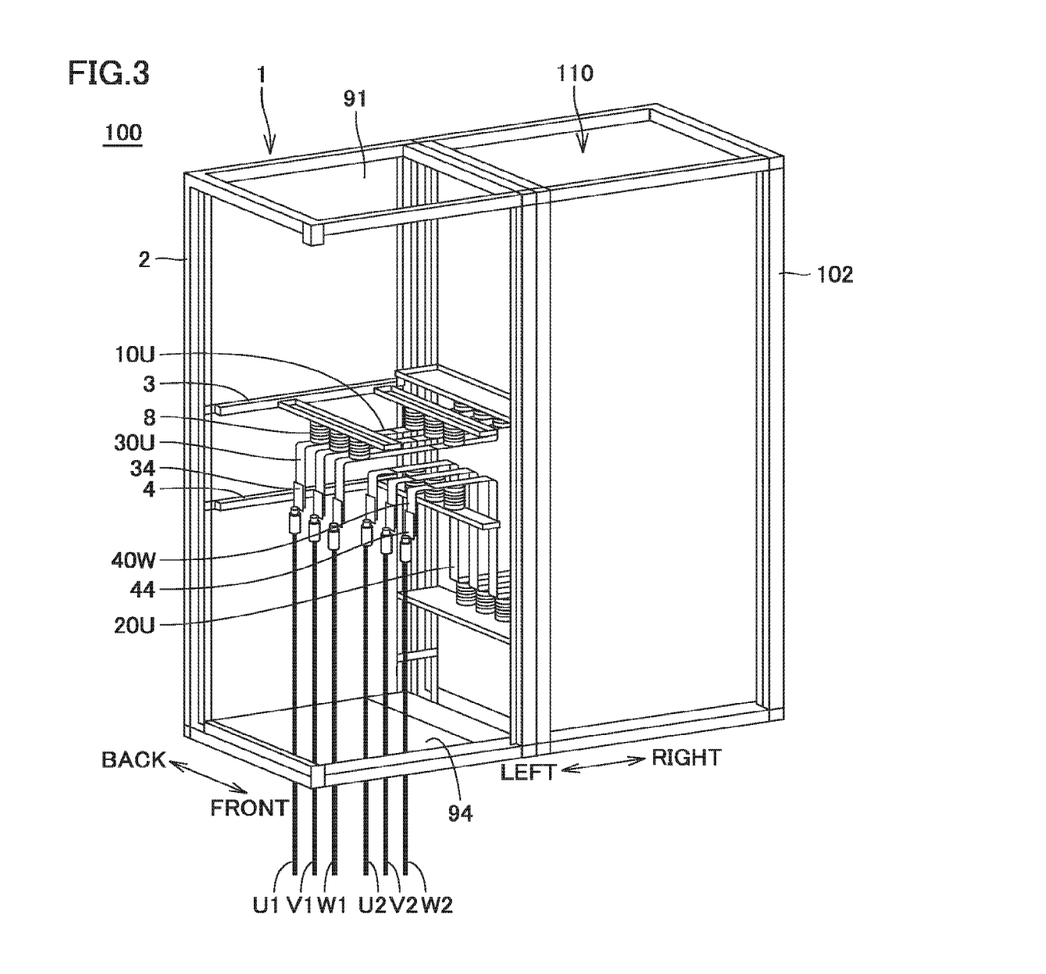
FIG. 3 is a perspective view showing a configuration inside a casing in a state where electric wires are drawn into a connection apparatus from below.
Figure 4:
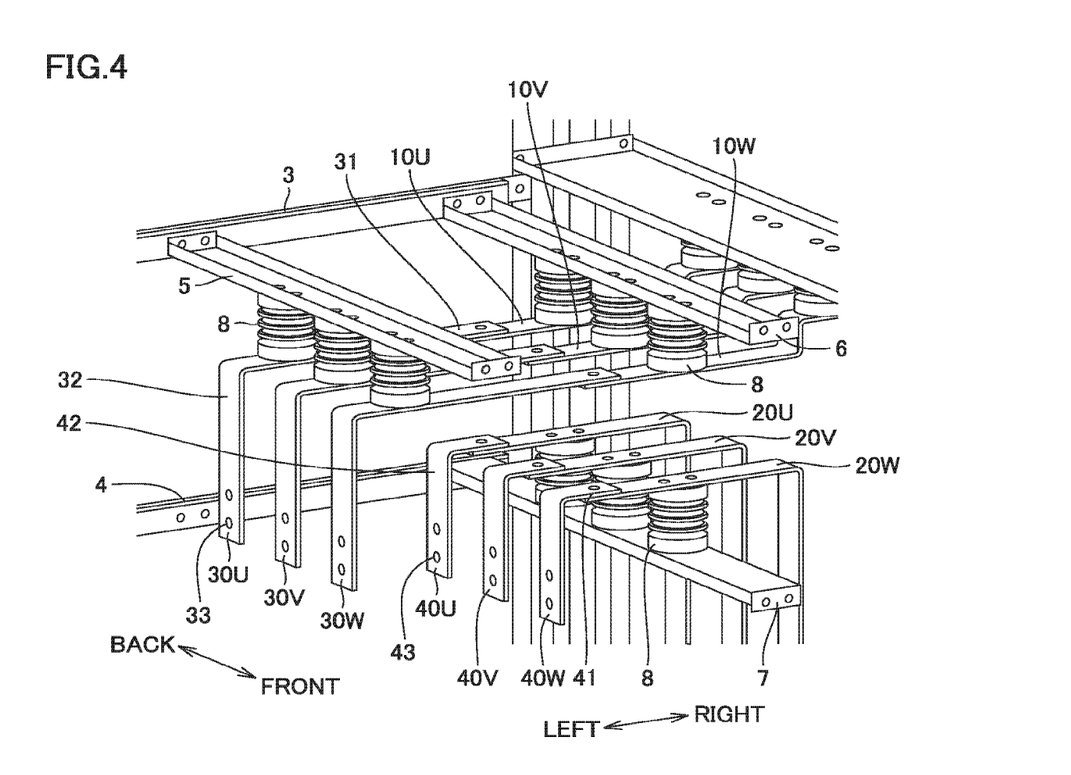
FIG. 4 is an enlarged perspective view of the vicinity of connection conductors and terminal conductors shown in FIG. 3.

FIGS. 3 and 4 are each a perspective view showing a configuration inside casing 90 in a state where the electric wires are drawn into connection apparatus 1 from below. FIGS. 5 and 6 are each a perspective view showing a configuration inside casing 90 in a state where the electric wires are drawn into connection apparatus 1 from above.

FIGS. 3 and 6 show a state where plate-shaped members constituting outer surfaces of casings 90 and 190 shown in FIG. 1 are removed so that the inside of casing 90 of connection apparatus 1 is visible. It should be noted that FIGS. 3 and 6 schematically show the various devices shown in FIG. 2 constituting multiple power compensator 110, collectively as a rectangular box as a whole.

As shown in FIG. 3, connection apparatus 1 has a frame 2 for supporting casing 90. Multiple power compensator 110 has a frame 102 for supporting casing 190. As described above, casing 90 and casing 190 are integrally formed. Accordingly, frame 2 and frame 102 are also formed as an integral structural body. It should be noted that, in FIG. 3 and FIG. 6 described later, one of column members constituting frame 2 is not shown for easier understanding of the configuration inside casing 90.

Support members 3 and 4 are attached to the column members on a back side of frame 2. Each of support members 3 and 4 is passed between a pair of column members on the back side of frame 2, and is fixed to both of the pair of column members. Support members 3 and 4 are aligned in this order downward from above. Support members 3 and 4 each have a substantially flat plate shape. Support members 3 and 4 extend in the left-right direction.

Although not shown, support members 3 and 4 are also attached to the column members on a front side of frame 2. Each of support members 3 and 4 is passed between a pair of column members on the front side of frame 2, and is fixed to both of the pair of column members. Support members 3 and 4 are aligned in this order downward from above. Support members 3 and 4 each have a substantially flat plate shape, and extend in the left-right direction. Support member 3 faces support member 3 in the front-back direction. Support member 4 faces support member 4 in the front-back direction.

Support members 5 and 6 are attached to support member 3 (see FIG. 4). Each of support members 5 and 6 is passed between a pair of support members 3, and is fixed to both of the pair of support members 3. Support members 5 and 6 are aligned in this order from the left toward the right. Support members 5 and 6 each have a substantially flat plate shape. Support members 5 and 6 extend in the front-back direction.

A support member 7 is attached to support member 4 (see FIG. 4). Support member 7 is passed between a pair of support members 4, and is fixed to both of the pair of support members 4. Support member 7 has a substantially flat plate shape, and extends in the front-back direction.

Support member 6 supports connection conductors 10U, 10V, and 10W. Support member 5 supports terminal conductors 30U, 30V, and 30W. Support member 7 supports connection conductors 20U, 20V, and 20W. FIG. 4 is an enlarged perspective view of the vicinity of connection conductors 10U, 10V, 10W, 20U, 20V, and 20W and terminal conductors 30U, 30V, 30W, 40U, 40V, and 40W shown in FIG. 3.

Connection conductor 10U is electrically connected to a U-phase terminal included in input terminal T1 shown in FIG. 2. Connection conductor 10V is electrically connected to a V-phase terminal included in input terminal T1 shown in FIG. 2. Connection conductor 10W is electrically connected to a W-phase terminal included in input terminal T1 shown in FIG. 2.

Connection conductors 10U, 10V, and 10W are made of a conductive material. Connection conductors 10U, 10V, and 10W are each formed in an elongated plate shape, and extend in the left-right direction. Connection conductors 10U, 10V, and 10W have shapes identical to one another. When viewed from the up-down direction, connection conductors 10U, 10V, and 10W are aligned in this order, with a spacing therebetween, in a direction extending forward from the back. Connection conductors 10U, 10V, and 10W are arranged at positions where they overlap one another when viewed from the front-back direction. Connection conductors 10U, 10V, and 10W may be arranged at positions where they are displaced from one another in the up-down direction.

A through hole (not shown) is formed at one end portion of each of connection conductors 10U, 10V, and 10W in a longitudinal direction. The through holes are used to connect connection conductors 10U, 10V, and 10W and terminal conductors 30U, 30V, and 30W, respectively.

Each of connection conductors 10U, 10V, and 10W and support member 6 are coupled by a coupling member 8. Coupling member 8 has an insulator, for example, and electrically insulates connection conductor 10U, 10V, 10W from support member 6. Connection conductors 10U, 10V, and 10W are integrally supported by support member 6.

Connection conductor 20U is electrically connected to a U-phase terminal included in output terminal T2 shown in FIG. 2. Connection conductor 20V is electrically connected to a V-phase terminal included in output terminal T2 shown in FIG. 2. Connection conductor 20W is electrically connected to a W-phase terminal included in output terminal T2 shown in FIG. 2.

Connection conductors 10U, 10V, and 10W and connection conductors 20U, 20V, and 20W are arranged with a spacing therebetween in the up-down direction. Connection conductors 20U, 20V, and 20W are arranged below connection conductors 10U, 10V, and 10W.

Connection conductors 20U, 20V, and 20W are made of a conductive material. Connection conductors 20U, 20V, and 20W are each formed in an elongated plate shape, and extend in the left-right direction. Connection conductors 20U, 20V, and 20W have shapes identical to one another. When viewed from the up-down direction, connection conductors 20U, 20V, and 20W are aligned in this order, with a spacing therebetween, in the direction extending forward from the back. Connection conductors 20U, 20V, and 20W are arranged at positions where they overlap one another when viewed from the front-back direction. Connection conductors 20U, 20V, and 20W may be arranged at positions where they are displaced from one another in the up-down direction.

A through hole (not shown) is formed at one end portion of each of connection conductors 20U, 20V, and 20W in a longitudinal direction. The through holes are used to connect connection conductors 20U, 20V, and 20W and terminal conductors 40U, 40V, and 40W, respectively.

Each of connection conductors 20U, 20V, and 20W and support member 7 are coupled by coupling member 8. Coupling member 8 has an insulator, for example, and electrically insulates connection conductor 20U, 20V, 20W from support member 7. Connection conductors 20U, 20V, and 20W are integrally supported by support member 7.

Terminal conductors 30U, 30V, and 30W are made of a conductive material. Terminal conductors 30U, 30V, and 30W are attached to connection conductors 10U, 10V, and 10W, respectively. Electric wires U1, V1, and W1 drawn into the inside of casing 90 of connection apparatus 1 are connected to terminal conductors 30U, 30V, and 30W, respectively.

Terminal conductors 30U, 30V, and 30W each have an elongated plate shape having a longitudinal direction extending in the left-right direction. Terminal conductors 30U, 30V, and 30W have shapes identical to one another. Terminal conductors 30U, 30V, and 30W each have a shape in which one end portion in the longitudinal direction is bent. Terminal conductors 30U, 30V, and 30W are aligned in this order in the direction extending forward from the back. Terminal conductors 30U, 30V, and 30W are arranged at positions where they overlap one another when viewed from the front-back direction.

Terminal conductor 30U has a fixed portion 31 and a connected portion 32. Fixed portion 31 and connected portion 32 each have an elongated plate shape. Fixed portion 31 extends in the left-right direction. Fixed portion 31 is attached to connection conductor 10U. A through hole that penetrates fixed portion 31 in a thickness direction is formed at one end portion of fixed portion 31 in the longitudinal direction. Terminal conductor 30U is fixed to connection conductor 10U by tightening a bolt that penetrates both the through hole formed in connection conductor 10U and the through hole formed in fixed portion 31.

Connected portion 32 is provided at one end portion of fixed portion 31 in the longitudinal direction. Connected portion 32 is joined to the left end portion of fixed portion 31. Fixed portion 31 and connected portion 32 may be formed integrally by bending and deforming one sheet of plate material.

Connected portion 32 extends in a direction orthogonal to the direction in which fixed portion 31 extends. Connected portion 32 extends downward. A plurality of through holes 33 are formed in connected portion 32. Through holes 33 are used to connect electric wire U1 to connected portion 32. As shown in FIG. 3, a crimp terminal 34 can be used to connect electric wire U1 to connected portion 32. Crimp terminal 34 is attached to a tip portion of electric wire U1. Through holes in the same number as that of through holes 33 formed in connected portion 32 are formed in crimp terminal 34. Electric wire U1 is fixed to terminal conductor 30U by tightening bolts that penetrate both of through holes 33 formed in connected portion 32 of terminal conductor 30U and the through holes formed in crimp terminal 34.

Terminal conductor 30V and terminal conductor 30W also have shapes identical to that of terminal conductor 30U. Fixed portion 31 of terminal conductor 30V is attached to connection conductor 10V. Connected portion 32 of terminal conductor 30V extends downward, and electric wire V1 is connected thereto. Fixed portion 31 of terminal conductor 30W is attached to connection conductor 10W. Connected portion 32 of terminal conductor 30W extends downward, and electric wire W1 is connected thereto.

Each of terminal conductors 30U, 30V, and 30W and support member 5 are coupled by coupling member 8. Coupling member 8 has an insulator, for example, and electrically insulates terminal conductor 30U, 30V, 30W from support member 5. Terminal conductors 30U, 30V, and 30W are integrally supported by support member 5.

Terminal conductors 40U, 40V, and 40W are made of a conductive material. Terminal conductors 40U, 40V, and 40W are attached to connection conductors 20U, 20V, and 20W, respectively. Electric wires U2, V2, and W2 drawn into the inside of casing 90 of connection apparatus 1 are connected to terminal conductors 40U, 40V, and 40W, respectively.

Terminal conductors 40U, 40V, and 40W each have an elongated plate shape having a longitudinal direction extending in the left-right direction. Terminal conductors 40U, 40V, and 40W have shapes identical to one another. Terminal conductors 40U, 40V, and 40W each have a shape in which one end portion in the longitudinal direction is bent. Terminal conductors 40U, 40V, and 40W are aligned in this order in the direction extending forward from the back. Terminal conductors 40U, 40V, and 40W are arranged at positions where they overlap one another when viewed from the front-back direction.

Terminal conductor 40U has a fixed portion 41 and a connected portion 42. Fixed portion 41 and connected portion 42 each have an elongated plate shape. Fixed portion 41 extends in the left-right direction. The length of fixed portion 41 in the left-right direction is shorter than the length of fixed portion 31 of terminal conductor 30U in the left-right direction. Fixed portion 41 is attached to connection conductor 20U. A through hole that penetrates fixed portion 41 in a thickness direction is formed at one end portion of fixed portion 41 in the longitudinal direction. Terminal conductor 40U is fixed to connection conductor 20U by tightening a bolt that penetrates both the through hole formed in connection conductor 20U and the through hole formed in fixed portion 41.

Connected portion 42 is provided at one end portion of fixed portion 41 in the longitudinal direction. Connected portion 42 is joined to the left end portion of fixed portion 41. Fixed portion 41 and connected portion 42 may be formed integrally by bending and deforming one sheet of plate material.

Connected portion 42 extends in a direction orthogonal to the direction in which fixed portion 41 extends. Connected portion 42 extends downward. The length of connected portion 42 in the up-down direction is shorter than the length of connected portion 32 of terminal conductor 30U in the up-down direction. However, connected portion 42 and connected portion 32 may have an equal length in the up-down direction, and the length of connected portion 42 in the up-down direction may be longer than the length of connected portion 32 in the up-down direction.

A plurality of through holes 43 are formed in connected portion 42. Through holes 43 are used to connect the electric wire to connected portion 42. As shown in FIG. 3, a crimp terminal 44 can be used to connect the electric wire to connected portion 42. Crimp terminal 44 is attached to a tip portion of the electric wire. Through holes in the same number as that of through holes 43 formed in connected portion 42 are formed in crimp terminal 44. Electric wire U2 is fixed to terminal conductor 40U by tightening bolts that penetrate both of through holes 43 formed in connected portion 42 of terminal conductor 40U and the through holes formed in crimp terminal 44.

Terminal conductor 40V and terminal conductor 40W also have shapes identical to that of terminal conductor 40U. Fixed portion 41 of terminal conductor 40V is attached to connection conductor 20V. Electric wire V2 is connected to connected portion 42 of terminal conductor 40V. Fixed portion 41 of terminal conductor 40W is attached to connection conductor 20W. Electric wire W2 is connected to connected portion 42 of terminal conductor 40W.

FIG. 3 shows a state where electric wires U1, V1, and W1 are connected to terminal conductors 30U, 30V, and 30W, respectively, and electric wires U2, V2, and W2 are connected to terminal conductors 40U, 40V, and 40W, respectively. Electric wires U1, V1, W1, U2, V2, and W2 penetrate bottom surface 94 and are drawn into the inside of casing 90 from below. Electric wires U1, V1, W1, U2, V2, and W2 extend in the up-down direction.

Electric wire U1 is connected to connected portion 32 of terminal conductor 30U connected to connection conductor 10U, using crimp terminal 34. U-phase voltage Vu is supplied from electric wire U1 to input terminal T1 shown in FIG. 2, via terminal conductor 30U and connection conductor 10U.

Electric wire V1 is connected to connected portion 32 of terminal conductor 30V connected to connection conductor 10V, using crimp terminal 34. V-phase voltage Vv is supplied from electric wire V1 to input terminal T1 shown in FIG. 2, via terminal conductor 30V and connection conductor 10V.

Electric wire W1 is connected to connected portion 32 of terminal conductor 30W connected to connection conductor 10W, using crimp terminal 34. W-phase voltage Vw is supplied from electric wire W1 to input terminal T1 shown in FIG. 2, via terminal conductor 30W and connection conductor 10W.

Since connected portion 32 of each of terminal conductors 30U, 30V, and 30W extends downward, electric wires U1, V1, and W1 can be connected to terminal conductors 30U, 30V, and 30W, respectively, without bending electric wires U1, V1, and W1 drawn into the inside of casing 90 from below, and with a short wire length.

Electric wire U2 is connected to connected portion 42 of terminal conductor 40U connected to connection conductor 20U, using crimp terminal 44. U-phase voltage Vu is outputted from output terminal T2 shown in FIG. 2 to electric wire U2, via connection conductor 20U and terminal conductor 40U.

Electric wire V2 is connected to connected portion 42 of terminal conductor 40V connected to connection conductor 20V, using crimp terminal 44. V-phase voltage Vv is outputted from output terminal T2 shown in FIG. 2 to electric wire V2, via connection conductor 20V and terminal conductor 40V.

Electric wire W2 is connected to connected portion 42 of terminal conductor 40W connected to connection conductor 20W, using crimp terminal 44. W-phase voltage Vw is outputted from output terminal T2 shown in FIG. 2 to electric wire W2, via connection conductor 20W and terminal conductor 40W.

Since connected portion 42 of each of terminal conductors 40U, 40V, and 40W extends downward, electric wires U2, V2, and W2 can be connected to terminal conductors 40U, 40V, and 40W, respectively, without bending electric wires U2, V2, and W2 drawn into the inside of casing 90 from below, and with a short wire length. FIG. 5 is a perspective view showing a state where terminal conductors 30U, 30V, 30W, 40U, 40V, and 40W are attached to connection conductors 10U, 10V, 10W, 20U, 20V, and 20W, respectively, in an attitude different from that shown in FIG. 3. As shown in FIG. 5, terminal conductors 30U, 30V, and 30W are attached to connection conductors 20U, 20V, and 20W, respectively. Terminal conductors 40U, 40V, and 40W are attached to connection conductors 10U, 10V, and 10W, respectively.

Fixed portion 31 of terminal conductor 30U is attached to connection conductor 20U. Connected portion 32 of terminal conductor 30U extends upward. Fixed portion 31 of terminal conductor 30V is attached to connection conductor 20V. Connected portion 32 of terminal conductor 30V extends upward. Fixed portion 31 of terminal conductor 30W is attached to connection conductor 20W. Connected portion 32 of terminal conductor 30W extends upward. Terminal conductors 30U, 30V, and 30W are aligned in this order in the direction extending forward from the back. Terminal conductors 30U, 30V, and 30W are arranged at positions where they overlap one another when viewed from the front-back direction.

Each of terminal conductors 30U, 30V, and 30W and support member 5 are coupled by coupling member 8. Coupling member 8 has an insulator, for example, and electrically insulates terminal conductor 30U, 30V, 30W from support member 5. Terminal conductors 30U, 30V, and 30W are integrally supported by support member 5. Support member 5 is attached to support member 4. Support member 5 is passed between a pair of support members 4, and is fixed to both of the pair of support members 4.

Fixed portion 41 of terminal conductor 40U is attached to connection conductor 10U. Connected portion 42 of terminal conductor 40U extends upward. Fixed portion 41 of terminal conductor 40V is attached to connection conductor 10V. Connected portion 42 of terminal conductor 40V extends upward. Fixed portion 41 of terminal conductor 40W is attached to connection conductor 10W. Connected portion 42 of terminal conductor 40W extends upward. Terminal conductors 40U, 40V, and 40W are aligned in this order in the direction extending forward from the back. Terminal conductors 40U, 40V, and 40W are arranged at positions where they overlap one another when viewed from the front-back direction.

Figure 5:
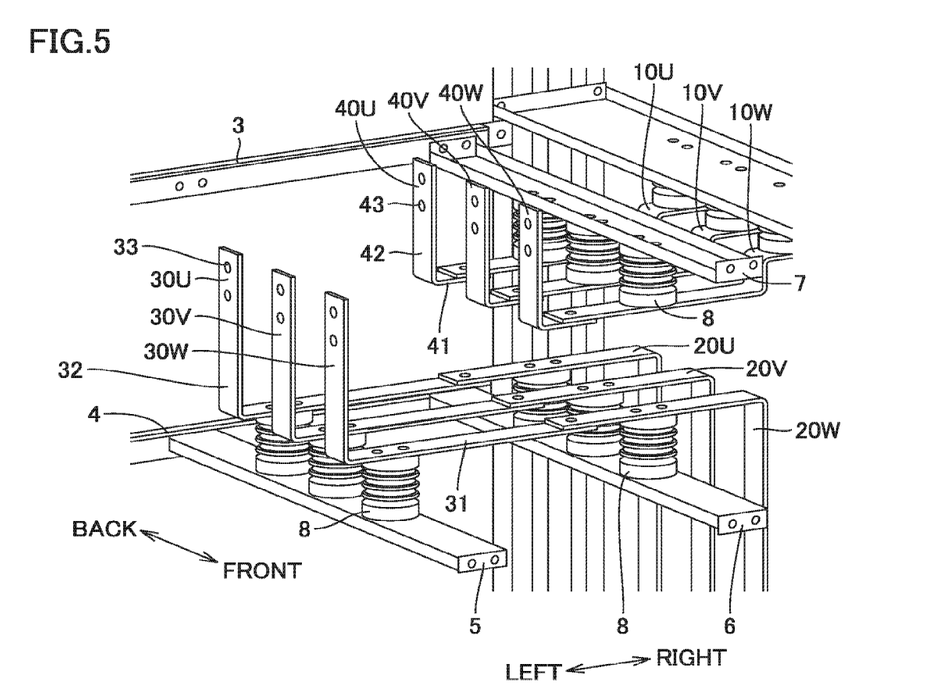
FIG. 5 is a perspective view showing a state where the terminal conductors are attached to the connection conductors in an attitude different from that in FIG. 4.
Figure 6:
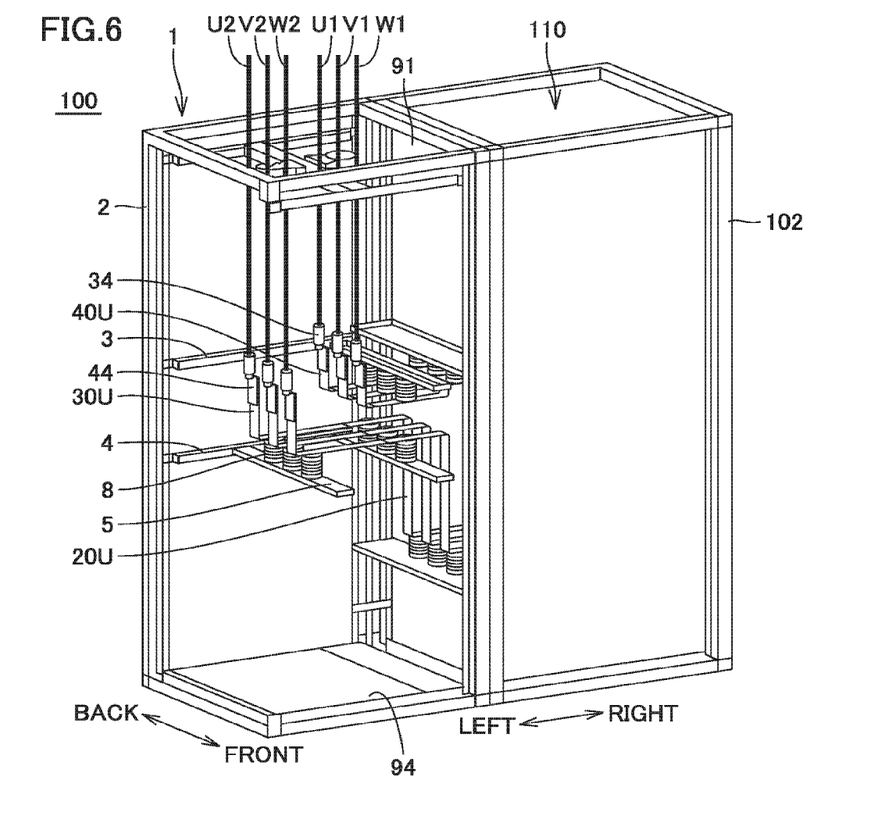
FIG. 6 is a perspective view showing a configuration inside the casing in a state where the electric wires are drawn into the connection apparatus from above.

FIG. 6 is a view showing a state where electric wires U1, V1, W1, U2, V2, and W2 are connected to terminal conductors 30U, 30V, 30W, 40U, 40V, and 40W shown in FIG. 5, respectively. Electric wires U1, V1, W1, U2, V2, and W2 penetrate ceiling surface 91 and are drawn into the inside of casing 90 from above. Electric wires U1, V1, W1, U2, V2, and W2 extend in the up-down direction.

Electric wire U1 is connected to connected portion 42 of terminal conductor 40U connected to connection conductor 10U, using crimp terminal 34. U-phase voltage Vu is supplied from electric wire U1 to input terminal T1 shown in FIG. 2, via terminal conductor 40U and connection conductor 10U.

Electric wire V1 is connected to connected portion 42 of terminal conductor 40V connected to connection conductor 10V, using crimp terminal 34. V-phase voltage Vv is supplied from electric wire V1 to input terminal T1 shown in FIG. 2, via terminal conductor 40V and connection conductor 10V.

Electric wire W1 is connected to connected portion 42 of terminal conductor 40W connected to connection conductor 10W, using crimp terminal 34. W-phase voltage Vw is supplied from electric wire W1 to input terminal T1 shown in FIG. 2, via terminal conductor 40W and connection conductor 10W.

Since connected portion 42 of each of terminal conductors 40U, 40V, and 40W extends upward, electric wires U1, V1, and W1 can be connected to terminal conductors 40U, 40V, and 40W, respectively, without bending electric wires U1, V1, and W1 drawn into the inside of casing 90 from above, and with a short wire length.

Electric wire U2 is connected to connected portion 32 of terminal conductor 30U connected to connection conductor 20U, using crimp terminal 44. U-phase voltage Vu is outputted from output terminal T2 shown in FIG. 2 to electric wire U2, via connection conductor 20U and terminal conductor 30U.

Electric wire V2 is connected to connected portion 32 of terminal conductor 30V connected to connection conductor 20V, using crimp terminal 44. V-phase voltage Vv is outputted from output terminal T2 shown in FIG. 2 to electric wire V2, via connection conductor 20V and terminal conductor 30V.

Electric wire W2 is connected to connected portion 32 of terminal conductor 30W connected to connection conductor 20W, using crimp terminal 44. W-phase voltage Vw is outputted from output terminal T2 shown in FIG. 2 to electric wire W2, via connection conductor 20W and terminal conductor 30W.

Since connected portion 32 of each of terminal conductors 30U, 30V, and 30W extends upward, electric wires U2, V2, and W2 can be connected to terminal conductors 40U, 40V, and 40W, respectively, without bending electric wires U2, V2, and W2 drawn into the inside of casing 90 from above, and with a short wire length.

Next, the function and effect of the present embodiment will be described.

Figure 7:
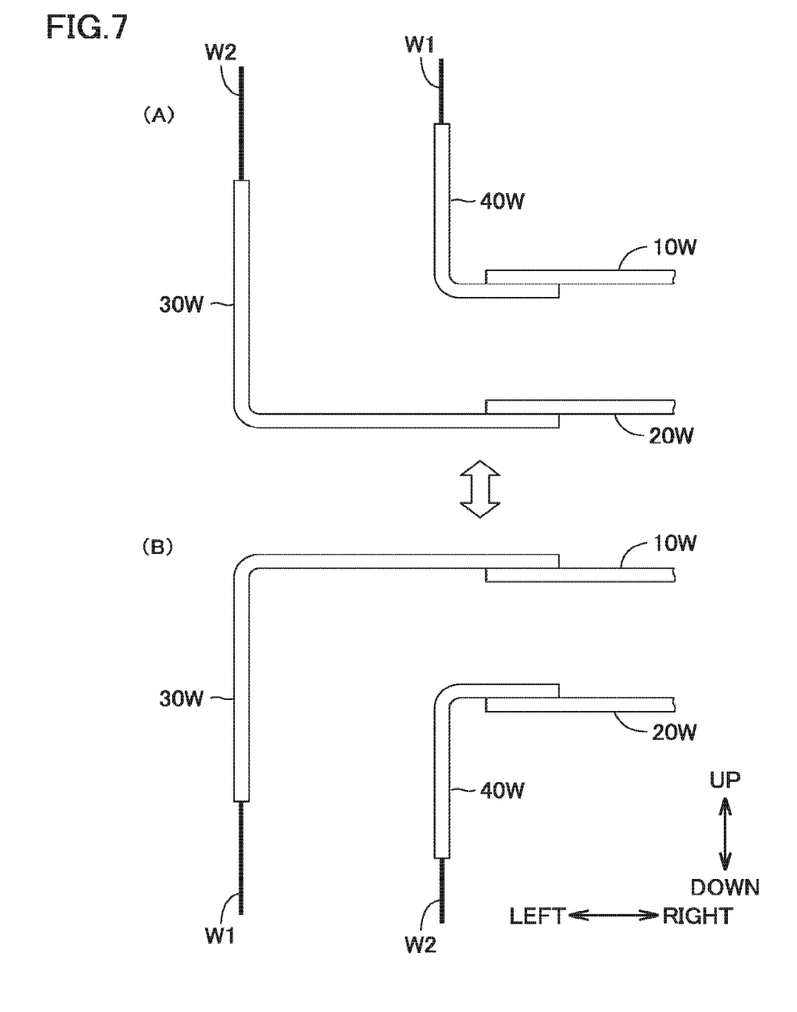
FIG. 7 is a plan view showing a state where a terminal conductor is attached to a connection conductor.

Connection apparatus 1 according to the present embodiment is an apparatus for connecting multiple power compensator 110 as an example of an electric device and electric wires U1, V1, W1, U2, V2, and W2. FIG. 7 schematically shows connection conductors 10U, 10V, 10W, 20U, 20V, and 20W and terminal conductors 30U, 30V, 30W, 40U, 40V, and 40W, of the perspective views of connection apparatus 1 shown in FIGS. 3 to 6.

FIG. 7(A) is a view schematically showing a state where connection conductors 10U, 10V, 10W, 20U, 20V, and 20W and terminal conductors 30U, 30V, 30W, 40U, 40V, and 40W in connection apparatus 1 shown in FIGS. 5 and 6 are viewed from the front-back direction.

Connection conductors 20U, 20V, and 20W are connected to output terminal T2 of multiple power compensator 110. Connection conductors 20U, 20V, and 20W have shapes identical to one another, and are arranged to be aligned with a spacing therebetween along the front-back direction (second direction), when viewed from the up-down direction (vertical direction). Connection conductors 20U, 20V, and 20W are arranged at positions where they overlap one another when viewed from the front-back direction.

Connection conductors 10U, 10V, and 10W are connected to input terminal T1 of multiple power compensator 110. Connection conductors 10U, 10V, and 10W have shapes identical to one another, and are arranged to be aligned with a spacing therebetween along the front-back direction, when viewed from the up-down direction. Connection conductors 10U, 10V, and 10W are arranged at positions where they overlap one another when viewed from the front-back direction.

In a state where electric wires U1, V1, W1, U2, V2, and W2 are drawn into connection apparatus 1 from above (hereinafter also referred to as a "first state") as shown in FIGS. 5 and 6, terminal conductors 30U, 30V, and 30W are attached to connection conductors 20U, 20V, and 20W, respectively. Terminal conductors 40U, 40V, and 40W are attached to connection conductors 10U, 10V, and 10W, respectively. Electric wires U1, V1, and W1 are connected to terminal conductors 40U, 40V, and 40W, respectively. Electric wires U2, V2, and W2 are connected to terminal conductors 30U, 30V, and 30W, respectively.

Terminal conductors 30U, 30V, and 30W correspond to one embodiment of "first to third terminal members". Connection conductors 20U, 20V, and 20W correspond to one embodiment of "first to third connection members". Terminal conductors 40U, 40V, and 40W correspond to one embodiment of "fourth to sixth terminal members". Connection conductors 10U, 10V, and 10W correspond to one embodiment of "fourth to sixth connection members". Electric wires U2, V2, and W2 correspond to one embodiment of "first to third electric wires". Electric wires U1. V1, and W1 correspond to one embodiment of "fourth to sixth electric wires".

As shown in FIG. 7(A), in the first state, terminal conductors 30U, 30V, and 30W are attached to connection conductors 20U, 20V, and 20W, respectively, in a first attitude in which connected portions 32 extend upward. Terminal conductors 40U, 40V, and 40W are attached to connection conductors 10U, 10V, and 10W, respectively, in the first attitude in which connected portions 42 extend upward.

Terminal conductors 30U, 30V, and 30W have shapes identical to one another. In the first state, terminal conductors 30U, 30V, and 30W are arranged to be aligned with a spacing therebetween along the front-back direction, when viewed from the up-down direction. Terminal conductors 30U, 30V, and 30W are arranged at positions where they overlap one another when viewed from the front-back direction. Terminal conductors 40U, 40V, and 40W have shapes identical to one another. In the first state, terminal conductors 40U, 40V, and 40W are arranged to be aligned with a spacing therebetween along the front-back direction, when viewed from the up-down direction. Terminal conductors 40U, 40V, and 40W are arranged at positions where they overlap one another when viewed from the front-back direction.

FIG. 7(B) is a view schematically showing a state where connection conductors 10U, 10V, 10W, 20U, 20V, and 20W and terminal conductors 30U, 30V, 30W, 40U, 40V, and 40W in connection apparatus 1 shown in FIGS. 3 and 4 are viewed from the front-back direction.

In a state where electric wires U1, V1, W1, U2, V2, and W2 are drawn into connection apparatus 1 from below (hereinafter also referred to as a "second state") as shown in FIGS. 3 and 4, terminal conductors 30U, 30V, and 30W are attached to connection conductors 10U, 10V, and 10W, respectively. Terminal conductors 40U, 40V, and 40W are attached to connection conductors 20U, 20V, and 20W, respectively. Electric wires U1, V1, and W1 are connected to terminal conductors 30U, 30V, and 30W, respectively. Electric wires U2, V2, and W2 are connected to terminal conductors 40U, 40V, and 40W, respectively.

As shown in FIG. 7(B), in the second state, terminal conductors 30U, 30V, and 30W are attached to connection conductors 10U, 10V, and 10W, respectively, in a second attitude in which connected portions 32 extend downward. Terminal conductors 40U, 40V, and 40W are attached to connection conductors 20U, 20V, and 20W, respectively, in the second attitude in which connected portions 42 extend downward.

In the second state, terminal conductors 30U, 30V, and 30W are arranged to be aligned with a spacing therebetween along the front-back direction, when viewed from the up-down direction. Terminal conductors 30U, 30V, and 30W are arranged at positions where they overlap one another when viewed from the front-back direction. Terminal conductors 40U, 40V, and 40W are arranged to be aligned with a spacing therebetween along the front-back direction, when viewed from the up-down direction. Terminal conductors 40U, 40V, and 40W are arranged at positions where they overlap one another when viewed from the front-back direction.

As shown in FIG. 7(A) and FIG. 7(B), connection apparatus 1 can switch the attitude of terminal conductors 30U, 30V, 30W, 40U, 40V, and 40W, between any of the first attitude and the second attitude, according to the direction in which electric wires U1, V1, W1, U2, V2, and W2 are drawn into connection apparatus 1. Thereby, whether electric wires U1, V1, W1, U2, V2, and W2 are drawn into connection apparatus 1 from above or from below, electric wires U1, V1, W1, U2, V2, and W2 can be connected to connected portions 32 and 42 of terminal conductors 30U, 30V, 30W, 40U, 40V, and 40W, without bending electric wires U1, V1, W1, U2, V2, and W2 extending in the up-down direction.

Further, since terminal conductors 30U, 30V, and 30W that receive the three-phase AC voltage have shapes identical to one another, commonality of the terminal conductors for the respective phases can be achieved. Since terminal conductors 40U, 40V, and 40W that receive the three-phase AC voltage have shapes identical to one another, commonality of the terminal conductors for the respective phases can be achieved. Thereby, terminal conductors 30U, 30V, 30W, 40U, 40V, and 40W can have simplified shapes, and thus processing cost can be reduced.

Further, in each of the first state shown in FIG. 7(A) and the second state shown in FIG. 7(B), since terminal conductors 30U, 30V, and 30W are arranged at positions where they overlap one another in the left-right direction when viewed from the front-back direction, the space occupied by terminal conductors 30U, 30V, and 30W in the left-right direction of casing 90 can be reduced, when compared with a configuration in which terminal conductors 30U, 30V, and 30W are arranged at positions where they are displaced from one another in the left-right direction. Since terminal conductors 40U, 40V, and 40W are arranged at positions where they overlap one another in the left-right direction when viewed from the front-back direction, the space occupied by terminal conductors 40U, 40V, and 40W in the left-right direction of casing 90 can be reduced, when compared with a configuration in which terminal conductors 40U, 40V, and 40W are arranged at positions where they are displaced from one another in the left-right direction.

Further, since the length of fixed portions 31 of terminal conductors 30U, 30V, and 30W in the longitudinal direction is longer than the length of fixed portions 41 of terminal conductors 40U, 40V, and 40W in the longitudinal direction, connection conductors 20U, 20V, and 20W that receive a first three-phase AC voltage and connection conductors 10U, 10V, and 10W that receive a second three-phase AC voltage can be arranged with a spacing therebetween in the up-down direction. Thereby, the space occupied by terminal conductors 30U, 30V, 30W, 40U, 40V, and 40W in the left-right direction of casing 90 can be reduced.

Further, connection apparatus 1 includes support member 5 for integrally supporting terminal conductors 30U, 30V, and 30W. With such a configuration, the length required to cantilever-support terminal conductors 30U, 30V, and 30W can be reduced, and connection apparatus 1 can have an improved strength.

Further, support member 5 is arranged opposite to connected portions 32 of terminal conductors 30U, 30V, and 30W in the up-down direction, when viewed from the front-back direction. Whether electric wires U1, V1, W1, U2, V2, and W2 are drawn into connection apparatus 1 from above or from below, common support member 5 can be adopted by changing the arrangement of support member 5 between the first state and the second state.

Further, connection apparatus 1 includes coupling members 8 that couple terminal conductors 30U, 30V, and 30W to support member 5. Each coupling member 8 has an insulator. With such a configuration, electric insulation among terminal conductors 30U, 30V, and 30W can be secured.

It should be understood that the embodiment disclosed herein is illustrative and non-restrictive in every respect. The scope of the present disclosure is defined by the scope of the claims, rather than the description above, and is intended to include any modifications within the scope and meaning equivalent to the scope of the claims.

REFERENCE SIGNS LIST

1: connection apparatus; 2, 102: frame; 3 to 7: support member; 8: coupling member; 10U, 10V, 10W, 20U, 20V, 20W: connection conductor; 30U, 30V, 30W, 40U, 40V, 40W: terminal conductor; 31, 41: fixed portion; 32, 42: connected portion; 33, 43: through hole; 34, 44: crimp terminal; 51: commercial AC power supply; 52: load; 53: power storage apparatus; 61, 65, 66: VCB; 62: high speed switch; 63: semiconductor switch; 64: mechanical switch; 68: bidirectional converter; 69: fuse; 70: current detector; 71: reactor; 72: capacitor; 80: transformer; 82: operation unit; 83: controller; 90, 190: casing; 91, 191: ceiling surface; 92, 192: front surface; 93: left side surface; 94: bottom surface; 95, 195: opening; 100: electric apparatus; 110: multiple power compensator; 198: operation panel; U1, V1, W1, U2, V2, W2: electric wire; T1: input terminal; T2: output terminal; T3: DC terminal.

The invention claimed is:

1. A connection apparatus for connecting an electric device and a plurality of electric wires, the connection apparatus comprising:
   a plurality of connection members connected to the electric device and extending in a first direction perpendicular to a vertical direction; and
   a plurality of terminal members which are attached to the plurality of connection members, respectively, and to which the plurality of electric wires are connected, respectively, wherein
   each of the plurality of terminal members includes
      a fixed portion attached to a connection member and extending in the first direction, and
      a connected portion which is joined to one end portion of the fixed portion in a longitudinal direction, and to which an electric wire is connected, the connected portion extending in a direction orthogonal to the direction in which the fixed portion extends, and
   each of the plurality of terminal members is attached to the connection member in any of a first attitude in which the connected portion extends upward in the vertical direction and a second attitude in which the connected portion extends downward in the vertical direction.

2. The connection apparatus for the electric device according to claim 1, wherein
the plurality of electric wires include first to third electric wires that transmit a first three-phase AC voltage,
the plurality of connection members include first to third connection members that receive the first three-phase AC voltage,
the plurality of terminal members include first to third terminal members having shapes identical to one another,
the first to third connection members have shapes identical to one another, and are arranged to be aligned with a spacing therebetween along a second direction perpendicular to the vertical direction and the first direction, when viewed from the vertical direction,
in a first state, the first to third terminal members are attached to the first to third connection members, respectively, in the first attitude, and the first to third electric wires are connected to the first to third terminal members, respectively, and
in the first state, the first to third terminal members are arranged to be aligned with a spacing therebetween along the second direction, when viewed from the vertical direction.

3. The connection apparatus for the electric device according to claim 2, wherein
the first to third connection members are arranged at positions where the first to third connection members overlap one another when viewed from the second direction, and
in the first state, the first to third terminal members are arranged at positions where the first to third terminal members overlap one another when viewed from the second direction.

4. The connection apparatus for the electric device according to claim 3, further comprising a support member attached to the fixed portions of the first to third terminal members, for integrally supporting the first to third terminal members,
wherein the support member is arranged opposite to the first to third connected portions of the first to third terminal members in the vertical direction, when viewed from the second direction.

5. The connection apparatus for the electric device according to claim 2, wherein
the plurality of electric wires include fourth to sixth electric wires that transmit a second three-phase AC voltage,
the plurality of connection members include fourth to sixth connection members that receive the second three-phase AC voltage,
the plurality of terminal members include fourth to sixth terminal members having shapes identical to one another, and the fixed portions of the fourth to sixth terminal members have a length in the longitudinal direction that is shorter than that of the first to third terminal members,
the fourth to sixth connection members have shapes identical to one another, are arranged to be aligned with a spacing therebetween along the second direction, when viewed from the vertical direction, and are arranged above the first to third connection members in the vertical direction, when viewed from the second direction,
in the first state, the fourth to sixth terminal members are attached to the fourth to sixth connection members, respectively, in the first attitude, and the fourth to sixth electric wires are connected to the fourth to sixth terminal members, respectively, and
in the first state, the fourth to sixth terminal members are arranged to be aligned with a spacing therebetween along the second direction, when viewed from the vertical direction.

6. The connection apparatus for the electric device according to claim 5, wherein
the fourth to sixth connection members are arranged at positions where the fourth to sixth connection members overlap one another when viewed from the second direction, and
in the first state, the fourth to sixth terminal members are arranged at positions where the fourth to sixth terminal members overlap one another when viewed from the second direction.

7. The connection apparatus for the electric device according to claim 5, wherein
in a second state, the first to third terminal members are attached to the fourth to sixth connection members, respectively, in the second attitude, and the fourth to sixth electric wires are connected to the first to third terminal members, respectively, and
in the second state, the first to third terminal members are arranged to be aligned with a spacing therebetween along the second direction, when viewed from the vertical direction.

8. The connection apparatus for the electric device according to claim 7, wherein
the fourth to sixth connection members are arranged at positions where the fourth to sixth connection members overlap one another when viewed from the second direction, and
in the second state, the first to third terminal members are arranged at positions where the first to third terminal members overlap one another when viewed from the second direction.

9. The connection apparatus for the electric device according to claim 8, further comprising a support member attached to the fixed portions of the first to third terminal members, for integrally supporting the first to third terminal members, wherein
the support member is arranged opposite to the first to third-connected portions of the first to third terminal members in the vertical direction, when viewed from the second direction.

10. The connection apparatus for the electric device according to claim 7, wherein
in the second state, the fourth to sixth terminal members are attached to the first to third connection members, respectively, in the second attitude, and the first to third electric wires are connected to the fourth to sixth terminal members, respectively, and
in the second state, the fourth to sixth terminal members are arranged to be aligned with a spacing therebetween along the second direction, when viewed from the vertical direction.

11. The connection apparatus for the electric device according to claim 10, wherein the first to third connection members are arranged at positions where the first to third connection members overlap one another when viewed from the second direction, and in the second state, the fourth to sixth terminal members are arranged at positions where the fourth to sixth terminal members overlap one another when viewed from the second direction.

12. An electric apparatus comprising:
the electric device; and
the connection apparatus according to claims 1.

* * * * *